United States Patent Office 3,406,183
Patented Oct. 15, 1968

3,406,183
3-N-ARYLAMINO-3-MERCAPTO-2-CYANO-ACRYLAMIDES
Réal Laliberté, Laval, Quebec, Canada, assignor to American Home Products Corporation, New York, N.Y., a corporation of Delaware
No Drawing. Filed Nov. 1, 1966, Ser. No. 591,088
4 Claims. (Cl. 260—326.5)

ABSTRACT OF THE DISCLOSURE

The present invention relates to 3-N-arylamino-3-mercapto-2-cyano-acrylamides and to the process for preparing them. These compounds are useful as anthelmintic and anti-bacterial agents.

---

The present invention relates to 3-N-arylamino-3-mercapto-2-cyano-acrylamides of the general formula I

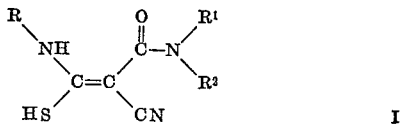

in which R represents the phenyl group which may be substituted with lower alkyl groups containing from 1–3 carbon atoms, lower alkoxy groups containing from 1–3 carbon atoms, halogen, or nitro groups, and in which $R^1$ represents hydrogen and $R^2$ represents a lower alkyl group containing from 1–3 carbon atoms or the phenyl group, or $R^1$ and $R^2$ together represent a heterocyclic group containing from 4–5 carbon atoms, such as, for example pyrrolidine or piperidine.

The compounds of this invention possess important biological properties and are valuable as medicaments. In particular, the compounds of this invention are powerful anthelmintics, especially active against adult worms of the oxyuridae family, for example, Syphacia obvelata. Those compounds may be formulated with suitable excipients in the form of tablets or capsules for oral administration and may be administered in single or divided doses containing from 100–500 mg. of the active ingredient.

The compounds of this invention also possess bactericidal activity against certain gram-positive and gram-negative micro-organisms such as, for example, Staphylococcus pyogenes (both penicillin-resistant and penicillin-sensitive strains) and Sarcina lutea. They are useful as anti-bacterial agents for topical administration, and may be administered in solution in suitable vehicles containing from 0.1–1% of the active ingredient.

More specifically, the compounds of this invention are prepared by reacting together substantially equimolar amounts of an appropriate phenyl-isothiocyanate with the sodium salt of an N-substituted cyano-acetamide in an appropriate solvent, for example, ethanol. The product is isolated after acidification and purified by recrystallization.

The following formulae and examples, in which R, $R^1$, and $R^2$ have the significance defined above, will illustrate this invention. The composition and structure of all compounds described are confirmed by elemental analysis.

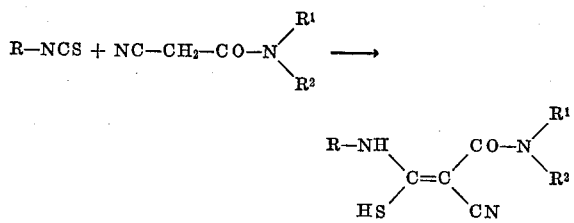

Example 1.—3-anilino-3-mercapto-2-cyano-N-phenylacrylamide

To the sodium salt of N-phenylcyanoacetamide (prepared from 0.025 mole in 75 ml. ethanol with 0.025 mole sodium ethoxide) one equivalent of phenylisothiocyanate is added and the resulting solution is kept on a steam bath for one hour. The solution is filtered. Hydrochloric acid is added to pH 4–5, followed by water to obtain turbidity and the solution is left to crystallize slowly. The solid is dissolved in methanol or acetone without heating and is crystallized by addition of water to M.P. 111–113° C.

In the same manner, by using one equivalent of p-methyl-, p-ethyl-, p-propyl-, o-methoxy-, o-ethoxy-, o-, m-, or p-chloro-, 2,4-dichloro-, o-, m-, or p-, bromo-, o-, m-, or p-nitro-phenylisothiocyanate, the corresponding 3-(p-methylanilino)-, 3 - (p - ethylanilino)-, 3-(p-propylanilino)-, 3-(o-methoxyanilino)-, 3-(o-ethoxyanilino)-, 3-(o-, m-, or p-chloroanilino)-, 3-(2,4-dichloroanilino)-, 3-(o-, m-, or p-bromoanilino)-, and 3-(o-, m-, or p-nitroanilino) - 3 - mercapto - 2-cyano-N-phenylacrylamides are also obtained.

Example 2.—1-(3-anilino-3-mercapto-2-cyanoacrylyl)-pyrrolidine 1-cyanoacetyl pyrrolidine (0.028 mole) is added to one equivalent of sodium ethoxide in ethanol (100 ml.), phenyl isothiocyanate (0.028 mole) is added, and the mixture is refluxed during 4 hours, cooled, acidified with hydrochloric acid to give a solid which is crystallized from ethanol to M.P. 154-156° C.

In the same manner, but using the substituted phenylisothiocyanates listed in Example 1, instead of phenylisothiocyanate, or 1-cyanoacetyl piperidine instead of 1-cyanoacetyl pyrrolidine, the corresponding 3-(p-methylanilino)-, 3-(p-ethylanilino)-, 3-(p-propylanilino)-, 3-(o-methoxyanilino)-, 3-(o-ethoxyanilino)-, 3-(o-, m-, or p-chloroanilino)-, 3-(2,4-dichloroanilino)-, 3-(o-, m-, or p-bromoanilino)-, and 3-(o-, m-, or p-nitroanilino)-3-mercapto-2-cyanoacrylyl pyrrolidines or -piperidines are also obtained.

Example 3.—3-anilino-3-mercapto-2-cyano-methylacrylamide

Methyl cyanoacetamide (0.051 mole) and 0.051 mole of phenylisothiocyanate are added to a solution of sodium ethoxide (0.112 mole of sodium in 100 ml. of ethanol). The mixture is refluxed for one and one-half hours, filtered, and the filtrate evaporated to dryness. A yellow oil is formed which is dissolved in water; upon acidification with hydrochloric acid the title compound is obtained as a solid, which is filtered off and crystallized from methanol, toluene, and isopropanol to M.P. 154–156° C.

In the same manner, when using ethyl or propyl cyanoacetamide instead of methyl cyanoacetamide, the corresponding 3-anilino-3-mercapto-2-cyano-ethyl acrylamide and 3-anilino-3-mercapto-2-cyano-propylacrylamide are also obtained.

I claim:
1. A compound of the formula

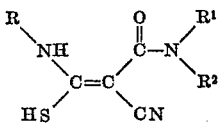

wherein R is selected from the group which consists of lower alkyl-substituted phenyl, lower alkoxy-substituted phenyl, halo-substituted phenyl and nitro-substituted phenyl; wherein $R^1$ represents hydrogen; and wherein $R^2$ is selected from the group which consists of lower alkyl, phenyl, and when joined with $R^1$, $R^1$ and $R^2$ together represent a heterocyclic group selected from pyrrolidine and piperidine.

2. 3 - anilino-3-mercapto-2-cyano-N-phenylacrylamide, as claimed in claim 1.

3. 1 - (3 - anilino - 3 - mercapto-2-cyanoacrylyl)-pyrrolidine, as claimed in claim 1.

4. 3 - anilino - 3 - mercapto - 2 - cyano - methylacrylamide, as claimed in claim 1.

References Cited
UNITED STATES PATENTS 3,272,810  9/1966  Strobel et al. _____ 260—247.1

NICHOLAS S. RIZZO, *Primary Examiner.*

M. NARCAVAGE, *Assistant Examiner.*